United States Patent Office 2,700,644
Patented Jan. 25, 1955

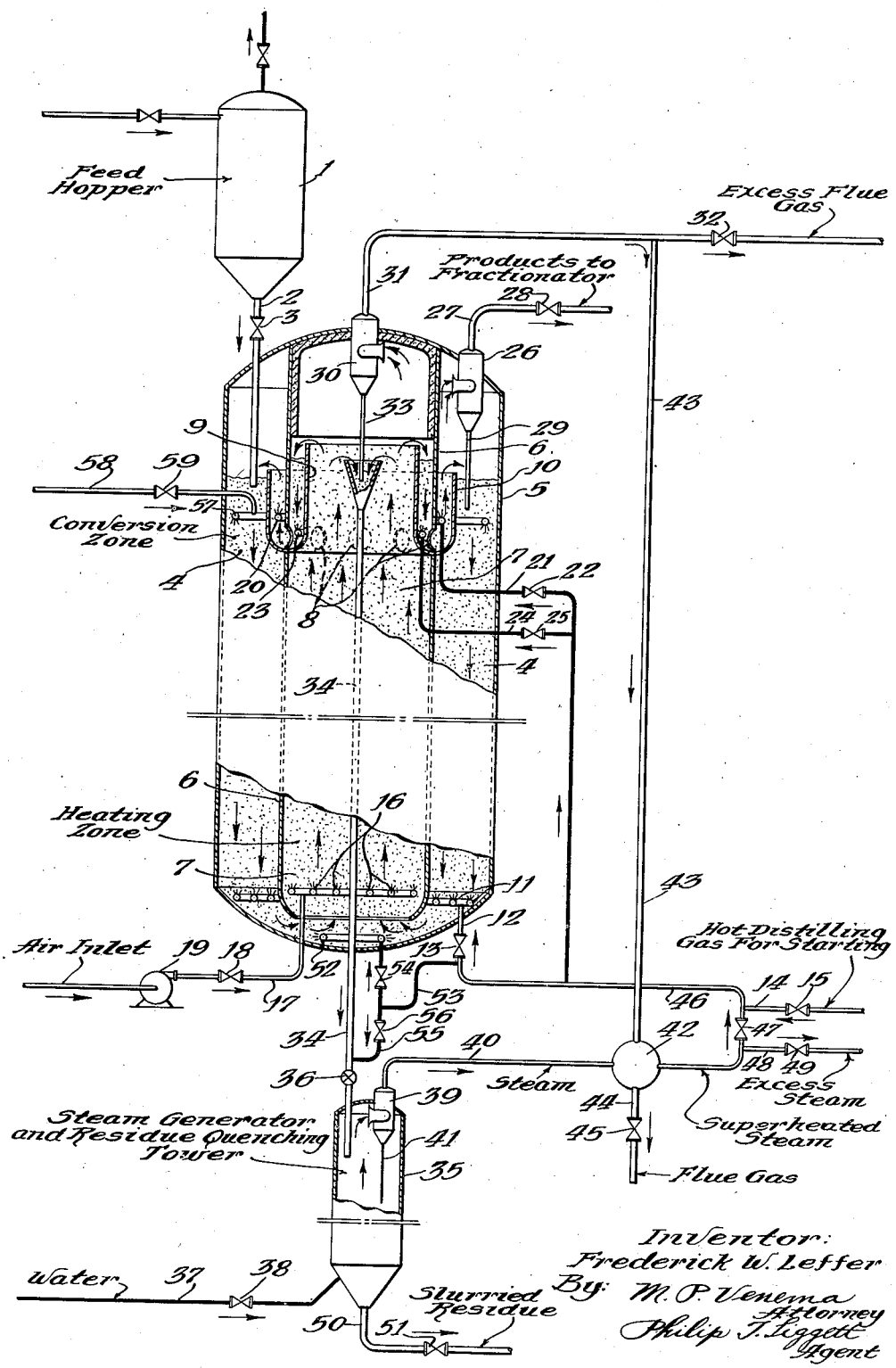

2,700,644

CONVERSION OF HYDROCARBONACEOUS REACTANTS IN A FLUIDIZED BED OF PARTICULATED SOLID MATERIAL

Frederick W. Leffer, Riverside, Ill., assignor to Universal Oil Products Company, Chicago, Ill., a corporation of Delaware Application August 12, 1949, Serial No. 109,966

5 Claims. (Cl. 202—91)

This invention relates to an improved method and apparatus for converting hydrocarbonaceous reactants of the group of heavy hydrocarbon oils and tars and of the group of hydrocarbonaceous solids, particularly oil shale, in a fluidized bed of particulated solid material with gasiform media to produce lower boiling or volatile products of greater commercial value and a solid residue. More specifically, the improvement provided by the invention is directed to the production of volatile destructive distillation and conversion products from the hydrocarbonaceous charge in a continuous manner in a single chamber arrangement having a conversion zone for contact of finely dispersed or particulated charge with a heated gasiform medium in a fluidized bed of residual solid particles adjacent to and in heat exchange relationship with a heating zone, carbonized solid particles from the former zone being contacted in the latter in a fluidized bed with a gaseous oxidizing medium to provide heat for the process, and pressure and flow being regulated between these processing zones such that mechanical valving is substantially eliminated between them.

There have been disclosed various types of moving bed and fluidized bed processes for the destructive distillation of oil shale or for similar treatments of normally solid or heavy liquid hydrocarbonaceous materials, but many of them involve the undesirable step of burning carbonaceous matter from the spent shale or other solid conversion residue in such manner that the desired low boiling products are commingled with gaseous combustion products which creates a subsequent problem in separation and fractionation. In other operations for the conversion of hydrocarbonaceous materials where separate conversion and heating zones are utilized and solid residues are produced, the arrangements of these zones and the flow therebetween have been rather unsatisfactory in view of undesirably long or narrow transfer conduits or rather troublesome valving or flow regulating means.

It is a principal object of the present invention to effect the conversion of hydrocarbonaceous reactants in an improved continuous operation within a compact flow system, which is formed primarily by adjacent conversion and heating zones and which provides for cyclically circulating particulated solid treating residue derived from the hydrocarbonaceous reactants through these zones in a manner permitting the generation of at least the major portion of the process heat requirements by combustion of carbonaceous conversion residue in the heating zone, the recovery of the volatile conversion products from the conversion zone substantially without contamination by combustion gases generated in the heating zone, and the continuous discharge of the net production of solid treating residue from the cycle by its withdrawal as a separate stream of solid particles from the heating zone.

In a more specific aspect of the invention it is an important object thereof to provide an improved operation within a compact flow system of the aforesaid kind wherein the circulating particulated solid treating residue descends in a fluidized bed in the conversion zone and ascends in a fluidized bed in the adjacent heating zone, volatile conversion products are evolved from the heavier hydrocarbonaceous reactant while the latter passes downwardly in the descending fluidized bed in the conversion zone, and the fluidized beds are maintained in a heat exchange relationship such that a maximum of heat is retained within the solids cycle and the operation is carried out at a high degree of thermal efficiency.

It is also an object of the present invention to utilize a solids transfer passageway or transfer well between the adjacent processing zones in conjunction with a downflow solids discharge from the heating zone and to regulate fluidization and the pressures within these zones such that the transfer of solid particles from the heating zone to the conversion zone may be controlled during simultaneous discharge of a separate stream of these particles from the heating zone to a heat recovery zone outside the contiguous processing zones.

It is a still further object of the invention to provide an improved unitary apparatus with means for separately recovering the gasiform products from the heating zone and the conversion zone and for transferring heated residual solid particles from the heating zone to both the conversion zone and a separate heat recovery zone by a direct flow of solid particles from the heating zone to the other zones, in a manner that precludes losing heat from the particles and by means which eliminates the need of tubular transfer conduits in the cycle of solid particles through the adjacent processing zones.

Broadly, the present invention provides a method for converting hydrocarbonaceous reactants in a fluidized bed of particulated solid material which comprises introducing a hydrocarbonaceous reactant stream in a confined conversion zone into a descending fluidized bed of heated particulated solid treating residue obtained as hereinafter set forth, converting the reactant stream in the descending bed into gasiform conversion products and solid carbonized residue in contact with an ascending heated gasiform non-oxidizing medium continuously introduced to the lower portion of the descending bed, entraining the solid carbonized residue in the descending bed and passing the resultant particulated mixture of treating residue and carbonized residue from the lower portion of the conversion zone to the lower portion of an adjacent confined heating zone, passing an oxidizing gas upwardly through the heating zone and therein burning controlled amounts of carbonaceous matter from the particulated mixture in an ascending fluidized bed thereof, thereby producing the aforesaid heated particulated solid treating residue and combustion gases, passing a portion of the heated treating residue from the upper portion of the ascending bed in the heating zone to the upper portion of the descending bed in the conversion zone, withdrawing the remaining portion of the solid treating residue as a separate particle stream from a point within the ascending bed and discharging said separate particle stream from the heating zone, continuously withdrawing the combustion gases from the upper portion of the heating zone and separately therefrom discharging a mixed stream of the gasiform conversion products and non-oxidizing medium from the upper portion of the conversion zone.

In one specific embodiment, the invention is applied to the conversion of heavy hydrocarbon oils such as topped crudes, residual oils from hydrocarbon oil distillation or cracking operations, heavy tar oils and the like, heavy hydrocarbonaceous materials liquid or semi-solid at ordinary temperature and not completely vaporizable at cracking temperatures, and comprises dispersing an at least partially liquid stream of the heavy hydrocarbon oil in a confined conversion zone into an elevated portion of a descending fluidized bed of heated coke particles obtained as hereinafter set forth, converting the oil in the descending bed into gasiform conversion products and coke-like residue in contact with an ascending heated gasiform non-oxidizing medium continuously introduced to the lower portion of the descending bed, entraining the coke-like residue in the descending bed and passing the resultant coke particle mixture from the lower portion of the conversion zone to the lower portion of a confined heating zone contiguous said conversion zone, passing an oxidizing gas upwardly through the heating zone and therein burning a controlled portion of the coke particle mixture in an ascending fluidized bed thereof maintained adjacent to and in heat exchange relationship with the descending fluidized bed in the conversion zone, thereby producing combustion gases and the aforesaid heated coke particles, passing a portion of the heated coke particles from the upper portion of the bed in the heating zone through a solids transfer passageway to the upper portion of the descending bed in the conversion zone, introducing a sealing fluid to the solids transfer passageway and therefrom discharging the sealing fluid in part into the conversion zone and in part into the heating zone, discharging the combustion gases from the upper portion of the heating zone while separately therefrom discharging a mixture of gasiform conversion products and non-oxidizing medium from the upper portion of the conversion zone, withdrawing excess coke particles as a separate particle stream from a point within the ascending fluidized bed and discharging this separate particle stream from the combustion zone.

In another specific embodiment, the method of the present invention is applied to the destructive distillation of hydrocarbonaceous solids, such as oil shale, tar sands, coal or the like materials containing a substantial proportion of incombustible components and comprises introducing a stream of the comminuted solid hydrocarbonaceous charge in a confined conversion zone to the upper portion of a descending fluidized bed of heated residual particles obtained as hereinafter set forth, destructively distilling the comminuted charge in the descending bed into gasiform conversion products and solid carbonized residue in contact with an ascending heated gasiform non-oxidizing medium introduced to the lower portion of the descending bed, entraining said carbonized residue in the descending bed and passing the resultant particulated mixture of residual particles and carbonized residue from the lower portion of the conversion zone to the lower portion of a confined heating zone contiguous said conversion zone, passing an oxidizing gas upwardly through the heating zone and therein burning the carbonaceous matter substantially from the particulated mixture in an ascending fluidized bed thereof maintained adjacent to and in heat exchange relationship with the descending fluidized bed in the conversion zone, thereby producing combustion gases and said heated residual particles, passing a portion of the heated residual particles from the upper portion of the bed in the heating zone through a solids transfer passageway to the upper portion of the descending bed in the conversion zone, introducing a sealing fluid to the solids transfer passageway and therefrom discharging the sealing fluid in part to the conversion zone and in part to the heating zone, discharging the combustion gases from the upper portion of the heating zone while separately therefrom discharging a mixture of gaseous conversion products and non-oxidizing medium from the upper portion of the conversion zone, withdrawing excess solid particles as a separate particle stream from a point within the ascending fluidized bed and discharging this separate particle stream from the heating zone.

In the present fluidized operation at least the major portion of the endothermic heat required for evolving gasiform products of conversion or destructive distillation from the hydrocarbonaceous charge within the conversion zone is supplied to this zone from the contiguous heating zone in part by the direct supply of highly heated residual particles from the heating zone to the conversion zone and in part by the indirect heat transfer from the ascending bed in the heating zone to the descending bed in the conversion zone. The transfer of highly heated particles from the upper portion of the ascending bed in the heating zone to the upper portion of the descending bed in the conversion zone assures an extremely rapid heating of the incoming hydrocarbonaceous charge to the required processing temperature substantially without agglomeration or baking together of the solid particles present while the indirect heat transfer between the two beds materially assists in maintaining the descending bed in the conversion zone at the required processing temperature throughout the operation. Any minor portion of the processing heat requirement not thus supplied from the heating zone is readily furnished in the heated gasiform fluid introduced as fluidizing medium to the lower portion of the descending bed in the conversion zone. In a preferred mode of operation such fluidizing medium is supplied to the conversion zone at at least the temperature maintained therein, and preferably at a higher temperature, and such temperature is imparted to this fluidizing medium by utilization of sensible heat carried out of the heating zone by the separate stream of excess solid residual particles, or by the stream of combustion gases or by both of these streams, in a manner more fully described hereinafter.

The fluidized beds in the processing zones are maintained at such fluid bed levels, known in the art as pseudo liquid levels, that the gasiform products will disengage readily in the form of so-called dilute or light phases from the beds into the upper portion of the conversion zone and the heating zone, respectively; at least a major portion of the solid particles entrained in low concentrations in the disengaging light phases will separate by gravitation and fall back into the respective fluidized beds, the remaining entrained particles being preferably separated by electrical, centrifugal or other suitable mechanical separating means, such as cyclone separators, to be returned thereafter to the respective fluidized beds. The solids transfer passage-way for the transfer of heated solid particles from the heating zone to the conversion zone accordingly is provided horizontally along a substantially vertical partitioning member between these zones and is spaced a sufficient distance from the top portions of the two processing zones to provide in each of them the required light phase disengaging and separating spaces. The pressure and fluidization of the bed within each of the adjacent processing zones are regulated so that the fluid bed level in the heating zone is higher than in the conversion zone at all times throughout the normal operation of the process and a continuous overflow of solid particles from the upper portion of the bed in the heating zone into the solids transfer passage-way and from the latter onto the top portion of the bed in the conversion zone is assured. When the pressure and fluidization of the bed in each of the processing zones have been established for a normal or balanced operation, the rate of overflow through the transfer passage-way is controlled primarily by regulation of the rate of withdrawal of the separate particle stream from within the fluidized bed in the combustion zone, the former rate being inversely proportional to the latter.

A most advantageous treatment of the hydrocarbonaceous charge is obtained when the separate particle stream withdrawn from within the ascending fluidized bed for discharge from the heating zone is substantially composed of exhaustively treated particles. In the type of operation directed to the production of coke as residue, exhaustively treated coke particles are characterized by lowest volatile content and greatest hardness and are obtained by passing the coke formed in the conversion zone through substantially the full height of the ascending bed in the heating zone and therein exposing it to extended heating at higher temperatures than the conversion temperature prevailing in the conversion zone. In the type of operation directed to the production of a substantially incombustible residue, as in the treatment of oil shale or similar hydrocarbonaceous solid charge having a substantial content of incombustible or ash-forming components, exhaustively treated residue particles are characterized by practically complete absence therefrom of carbon matter and are obtained upon exhaustive combustion treatment with oxidizing gas in the heating zone. Accordingly, the invention, in a particular embodiment, provides for withdrawing the separate particle stream from a point within the upper portion of the ascending fluidized bed in the heating zone through a confined downflow discharge path extending in a straight line downwardly through the heating zone and preferably terminating in a heat recovery zone below and in vertical alignment with the heating zone. Thus, the upper or intake end of the confined downflow discharge path is suitably provided at an elevation slightly below the level of the upper or intake opening of the solids transfer passage-way or particle transfer well between the contiguous processing zones.

The hydrocarbonaceous charge is contacted in the conversion zone with a gasiform non-oxidizing fluidizing medium which may be inert at the conversion temperature and pass in chemically unchanged condition through the descending bed and out of the conversion zone together with the gasiform products evolved from the hydrocarbonaceous charge in this zone. A preferred fluidizing medium of this kind is steam which can be readily separated from the gases and normally liquid hydrocarbons contained in the gasiform effluent of the conversion zone. The gasiform fluidizing medium, however, need not necessarily be inert, and may participate more or less in the reactions which take place in the conversion zone and which comprise a destructive distillation of the hydrocarbonaceous content of the charge with release therefrom of volatile hydrocarbons. Depending primarily on the temperature maintained in the descending fluidized bed and on the nature of the hydrocarbonaceous charge, the gasiform products evolved therefrom in the conversion zone comprise substantial but variable proportions of normally liquid hydrocarbons and normally gaseous combustible products, including low molecular hydrocarbons and hydrogen.

In some modes of operation and particularly when aiming at a maximum yield of normally liquid hydrocarbons, it may be advantageous to separate the normally liquid hydrocarbons and, if so desired, also the normally gaseous hydrocarbons of at least two or three carbon atoms per molecule from the gasiform effluent of the conversion zone and recover them as primary products of the process while returning a stream of the lighter gases, including hydrogen and methane, as the gasiform fluidizing medium to the conversion zone upon intervening reheating to the desired temperature. In other modes of operation and particularly when aiming at a maximum yield of normally gaseous or low-boiling olefinic hydrocarbon mixtures, it may be preferable to separate the higher boiling normally liquid hydrocarbons, or particular fractions of such higher boiling hydrocarbons, from the gasiform effluent of the conversion zone and return them in reheated state to the conversion zone to serve therein as fluidizing medium and at the same time to undergo further conversion into the desired low boiling hydrocarbons. Furthermore, a separate gasiform fluidizing medium such as steam or a low molecular gas recovered from the gasiform effluent of the conversion zone may be heated to a temperature above that desired in the descending fluidized bed and thereupon introduced to the lower portion of this bed while concurrently an undesirably high boiling, normally liquid hydrocarbon fraction, such as heavy gas oil fraction, separated from the gasiform effluent of the conversion zone, may be reheated to a lower conversion temperature under non-coking conditions and thereupon introduced to the descending bed at a level somewhat above the supply of the highly heated fluidizing medium thereto, but substantially below the fluid level of this bed in order to subject the high boiling oil fraction to cracking into lower boiling hydrocarbons simultaneously with the evolution of destructive distillation products from the heavier hydrocarbonaceous charge supplied in solid or at least partially liquid state to the upper portion of the descending fluidized bed.

In all of the modes of operation of the present process, the solid particles reaching the lower end of the descending fluidized bed in the conversion zone contain carbonaceous matter derived from the hydrocarbonaceous charge and incapable of vaporization at the processing temperatures. A controlled portion or all of this carbonaceous matter, present substantially in the form of coke at this stage of the process, is burned by passing the solid particles into the lower portion of the heating zone and thereupon contacting them in the ascending fluidized bed with an oxidizing gas at a temperature of at least about 1000° F. and generally at a higher temperature than that maintained in the bed in the contiguous conversion zone. The oxidizing gas may ordinarily be air, or an admixture of air with steam or hot flue gases recirculated from the upper portion of the heating zone, and the combustion may be effected at between 1000° F. and 1400° F. when it is desired primarily to furnish the heat requirements of the process by the burning in the heating zone and to waste the resultant net production of flue gases upon recovery of sensible heat therefrom. Alternatively, the oxidizing gas supplied to the heating zone may be oxygen of high purity, such as a gas of 85–98% oxygen concentration as such or in admixture with steam or carbon dioxide or with a portion of the hot gaseous effluent of the heating zone in order to provide both for the generation of the heat requirements of the process and the production of a gas of substantial carbon monoxide content and suitable for separate further conversion into a mixture of hydrogen and carbon monoxide for use in the synthesis of hydrocarbons or oxygenated hydrocarbon derivatives. When thus utilizing substantially pure oxygen, or an oxygen gas mixture of considerably lower nitrogen content than that of air, the burning temperature in the ascending fluidized bed is maintained substantially higher than when utilizing air as principal component of the oxidizing gas and preferably at a temperature of the order of 1600–1800° F. when treating a hydrocarbonaceous charge of only insignificant ash content, and as high a temperature above 1400° F. and up to about 1800° F. as can be tolerated without sintering of the ash components in the ascending fluidized bed when charging solid hydrocarbonaceous material of substantial ash content to the conversion zone.

The invention outlined above and further features thereof will now be described in greater detail with reference to the destructive distillation of oil shale, which is typical of the solid hydrocarbonaceous charging stocks contemplated herein. A stream of comminuted oil shale is supplied to an elevated portion of the conversion zone to establish therein a solid particle bed which is fluidized by supplying a stream of superheated steam or other highly heated gaseous fluidizing medium of non-oxidizing nature at a temperature somewhat above the desired conversion temperature to the lower portion of the conversion zone at a rate of flow which maintains a fluid bed level in proximity of the discharge level of the solids transfer passage-way between the conversion zone and the contiguous heating zone, the latter being at its lowermost part in open communication with the lowermost part of the former. The head of the fluidized bed in the conversion zone causes solid particles to pass into the lower portion of the heating zone and upwardly therein, while comminuted fresh solid charge is continuously added to the upper portion of the fluidized bed in the conversion zone. The solid particles thus forced into the heating zone are fluidized therein by a stream of oxidizing gas such as air which is supplied at such rate of flow that the upflowing gas and the gaseous combustion products resulting from the burning of carbon matter from the solid particles in the heating zone at the elevated temperature prevailing therein fluidize the solid particles and maintain them in an ascending fluidized bed the upper level of which is established substantially at or slightly above the intake level of the solids transfer passage-way. The incoming comminuted oil shale charge is rapidly heated to an effective temperature for destructive distillation thereof by means of recycled shale residue which has been burned and heated within the heating zone and then passes through the overflow passageway into the conversion zone.

The amount of burning within the heating zone and the heating of the resultant shale ash or spent shale is regulated by the free oxygen content of the oxidizing gas supplied to the heating zone. Where a substantial quantity of gaseous medium of lower oxygen content than air is required in the heating zone to maintain simultaneously the desired fluidization and the desired combustion and heating, then a gaseous medium reducing such oxygen content, preferably a portion of the hot gaseous effluent of the heating zone is mixed with air in appropriate proportions. The combined heating effect obtaining by the transfer of heated solid through the transfer passageway, the indirect transfer of heat through the confining partition between the contiguous zones, and the supply of heat in the fluidizing medium entering the conversion zone is regulated so that the temperature within the descending fluidized bed in the conversion zone is maintained at from about 850° to about 1400° F., and in most cases, between about 900° and about 1100° F., this temperature ordinarily is adequate for substantially complete and efficient destructive distillation of oil shale charged to the conversion zone, so that the solid particles passing from the latter into the heating zone are practically free from volatile and tacky hydrocarbonaceous matter. A temperature of at least about 1100° F. and preferably of the order of 1200° F. to 1400° F. is maintained within the heating zone, and in normal operations provides sufficient heating of the residual particles being returned to the conversion zone in a substantially exhausted or carbon-free state. The flow of such residual particles to the conversion zone is facilitated by a sealing fluid introduced to the transfer well or solids transfer passageway in a manner and at a rate precluding the compacting of the solid particles within this well and also precluding the passage of gasiform products from one of the contiguous processing zones to the other. The flow of residual particles through the transfer well is controlled by the withdrawal of excess residual particles from an elevated point within the ascending fluidized bed and beneath the fluid level of the latter to a heat recovery zone separate from and external to the contiguous processing zones and preferably aligned vertically below the heating zone.

In a preferred arrangement and flow of particles, the descending fluidized bed of particles within the conversion zone is maintained in an annular shaped column which circumscribes a concentrically placed heating zone, which in turn confines the ascending fluidized bed of spent shale and residual particles. A unitary single chamber may be utilized, with a cylindrical baffle or partition placed therein to enclose the heating zone or zone of highest temperatures in the central or axial portion of the chamber. This partitioning means may depend from the upper head of the chamber and extend to a point just above the lower head of the chamber in a manner to allow the passage of solid particles from the outer annular conversion zone into the inner heating zone. In this flow arrangement of concentric processing zones the solids transfer passageway or transfer well is provided at an elevated portion of the cylindrical partition and preferably in a substantially circular trough-like arrangement intersecting the cylindrical partition.

The arrangement of the separate contacting zones in a contiguous and heat exchange relationship permits the flow of particles from one zone to the other with very little heat loss and a high degree of thermal efficiency as compared to those units which maintain relatively long or external conduits for passing particles from one zone to the other. The partitioning member between the adjacent zones or at least the portion of the partitioning member below the solids transfer passage way is preferably corrugated or deformed to provide an increased area or surface for transferring heat from one zone to the other so that heating and destructive distillation may be aided throughout the height of the fluidized bed of particles descending in the conversion zone. The corrugation of the partitioning member is preferably vertical to reduce resistance to flow of the fluidized beds; alternatively, vertical fins may be provided on either or both sides of the partitioning member along the height of the fluidized beds to promote heat transfer through the partitioning member. The trough-like arrangement of the overflow well for guiding the transfer of particles from the upper portion of the heating zone to the upper portion of the conversion zone is such that a vertical dividing wall, which is hermetically sealed along its upper edge to the partitioning member or is formed by a portion of the latter, projects downwardly between the side walls of the trough so that the resultant overflow well acts essentially in the manner of a U-tube; this arrangement not only eliminates mechanical valving means and conventional tubular solids transfer conduits, but also provides a sealing or trapping arrangement which prevents the intermingling of gasiform products from one of the contiguous zones with those from the other, such that resulting combustion gases can be discharged from the upper portion of the heating zone, and resulting gasiform distillation and conversion products are separately discharged from the upper portion of the conversion zone and may be passed to fractionating equipment without being contaminated with combustion products.

It is still another feature of a preferred embodiment of the present invention to maintain a continuous withdrawal of highly heated excess treating residue, such as the net production of coke particles or incombustible ash respectively, from the treating zone in a confined straight-line path downwardly through the central portion of the heating zone to a point exterior thereof, preferably passing this separate particle stream to a suitable quenching and cooling zone for the generation of a hot gaseous stream which may be used in the process. In one embodiment, the excess shale ash or coke particles are passed vertically downwardly in a relatively compact descending stream to a steam generating zone, which is disposed below the treating zone and wherein the particles pass in a relatively dense bed or mass countercurrently to an aqueous medium being charged to the lower end of the steam generating zone. Where high temperature steam is desired, water is injected into the lower portion of the quenching zone and permitted to countercurrently contact the descending particles and to form steam within an elevated portion of this zone. This steam may be withdrawn from the upper portion of the quenching and heat recovery zone through suitable separating means in order to obtain a substantially particle-free gasiform stream for use in the contacting chambers or other portions of the processing equipment.

High temperature superheated steam may be used advantageously as the fluidizing medium within the conversion zone of the unit. Thus, in a preferred embodiment, superheated steam is distributed uniformly within the cross-sectional area of the lower portion of the conversion zone such that it may ascend countercurrently to the descending hydrocarbonaceous charge and recycled residual particles and provide a suitable fluidizing medium as well as a high temperature gaseous medium that will strip the lower portion of the descending fluidized bed at at least as high a temperature as the average temperature of the more elevated portions of the descending bed and will exert both a heat-carrying and a partial pressure effect on the fresh hydrocarbonaceous charge and thereby materially aid the destructive distillation of the latter. High temperature steam may be used to advantage as a stripping medium also at other points of the system, notably to effect the stripping and fluidizing of the carbonized particles during their passage from the conversion zone into the heating zone, to act as sealing fluid in the solids transfer passageway, and to preclude excessive compacting of the stream of hot residual particles which upon its withdrawal as excess solid from the heating zone is transferred in a confined straight line path downwardly into the quenching and cooling zone. By superimposing the heating zone above and in vertical alignment with the quenching and heat recovery zone, the generation and utilization of superheated steam in the aforesaid manner avoids the need for compression or blowing devices in the lines for the transfer of this steam.

In the conversion in the present process of heavy hydrocarbonaceous materials which are herein referred to generally as heavy hydrocarbon oils and which are characterized by an insignificantly small content of ash-yielding components, the procedure outlined above with reference to solid hydrocarbonaceous materials of the type of oil shale is varied in some details without, however, deviating from the principal features of the invention. Not only normally liquid hydrocarbon oils such as topped and reduced crudes, liquid cracked residues, and similar normally liquid hydrocarbon materials, but also normally solid and semi-solid hydrocarbon materials such as asphalts and coal tar residues, which become liquid at moderately elevated temperatures, of the order of 85°–250° F., are readily converted by the present process into lower boiling products and hard coke of lower volatility and greater structural strength than obtained in the conventional oil coking methods. Thus, the conversion of these heavy hydrocarbon oil charging stocks, liquid or liquefiable at temperatures below about 250° F., by the present process permits to obtain commercially valuable coke as well as low boiling hydrocarbons of considerably greater value than that of the starting material.

In processing these heavy hydrocarbon oil charging stocks, the charge is preheated under non-coking conditions and a stream of the charge at a temperature of from about 500° to about 700° F. and in substantially or at least partially liquid state is introduced to and dispersed in the descending fluidized bed of heated treating residue, substantially consisting of coke particles formed in the process. The preheated charge is preferably introduced at an elevated point of the descending fluidized bed in the conversion zone, that is slightly below the fluid level of the bed therein. The heated particulated coke is introduced from the heating zone to the conversion zone at a sufficient temperature and in sufficient amount to impart to the incoming preheated charge almost instantaneously an effective cracking and coking temperature of at least 800° F. and preferably in the order of 850°–1000° F., while the fluidized bed is maintained at this temperature in the manner already described.

In the coke-producing operation, as well as in the treatment of solid charging stocks yielding an ash-like residue, the contiguous processing zones are maintained ordinarily at substantially the same superatmospheric pressure of the order of 5–250 pounds per square inch, although these zones may also be operated at a controlled pressure differential amounting to a small fraction of the superatmospheric pressure within the above range in either of these zones. Pressures between 5 and 15 pounds per square inch are preferred for normal operations for coke production as well as for the production of ash-like residue.

In the descending fluidized bed the oil charge is destructively distilled and the resultant non-vaporising portion of the charge and conversion products is converted into substantially dry coke-like matter in the course of the downward travel of the descending fluidized bed. The coke-like matter is entrained with or deposited on the circulating coke particles and also forms new nuclei of coke in the fluidized bed.

The entire mass of coke particles passes from the bottom portion of the conversion zone into the heating zone wherein it is maintained in an ascending fluidized bed by an oxygen-containing gas, preferably a mixture of air and recirculated hot combustion gases. Sufficient oxygen is provided in the fluidized gas to burn coke in the ascending fluidized bed at an average bed temperature of from about 900° F. to 1250° F. and in a quantity required for furnishing the heat requirements of the process, when operating the latter primarily for the production of coke as principal by-product.

When desiring the production of a combustion gas mixture of high carbon monoxide content, however, the burning is effected at the substantially higher temperatures hereinbefore mentioned and with a gas of materially lower nitrogen content than results from the use of air as the direct source of oxygen supply to the heating zone. Both in the operation for the production of coke as principal by-product and in the operation for generating gas of high carbon monoxide content, a net production of coke is continuously withdrawn from within the ascending fluidized bed and from the process whereby any accumulation of incombustible minerals or ash within the system is precluded.

The fluidizing medium supplied to the conversion zone during the coke-producing operation is preferably superheated steam produced within the process and introduced to the conversion zone at a suitable temperature of from about 850° to 1000° F. However, light gas separated from the effluent of the conversion zone may be used at like temperatures instead of steam, particularly when a relatively high pressure is maintained in the contiguous processing zones and permits fractionation of the effluent of the conversion zone at similarly high pressures. In all of the modes of coke-producing operation, as in the destructive distillation of ash-containing solid hydrocarbonaceous charging stocks, the present process is distinguished by an unusually low loss of heat from the system which contributes materially to the high thermal efficiency and economy of the process.

Other advantages and features of the present invention will be apparent upon reference to the accompanying drawing and to the following description thereof. The drawing illustrates diagrammatically and without exact scale or proportion a preferred apparatus and process flow in accordance with the present invention.

Referring now to the drawing in connection with the treatment of solid hydrocarbonaceous material yielding an ash-like residue, such material is passed in comminuted state from a suitable feed hopper 1 and line 2 having a control valve 3 to the upper portion of a conversion zone 4 and into the upper portion of a hot fluidized bed of particles therein. The conversion zone 4 is maintained within a suitable, vertically elongated chamber 5. Destructive distillation of the fresh hydrocarbonaceous material is thus effected in a descending fluidized bed of intimately commingled freshly charged particles and recycled heated particles of solid treating residue. The comminuted solid charge is preferably supplied through line 2 and valve 3 in a dried and preheated condition, which may be obtained for example by contacting the initial hydrocarbonaceous material with flue gases of such temperature that the solid particles are heated to about 200°–300° F. substantially without evolution of hydrocarbons therefrom. A cylindrical internal baffle or partition 6 extends downwardly from the top of the chamber 5 and provides a confined heating zone 7 which is separate from but adjacent to and in heat exchange relationship with the conversion zone 4.

At an elevated portion of the partitioning member 6 there are provided a plurality of openings 8 substantially uniformly spaced from each other along a horizontal circumferential line of the member 6, an inner wall 9 and an external wall 10, all of which provide a substantially circular trough or particle transfer well of U-shaped cross-section that permits the passage of solid particles from the upper portion of heating zone 7 into the conversion zone and by the downward projection of an unperforated portion of the member 6 deep into the trough or well precludes the flow of combustion gases to the upper portion of the adjacent zone, and of gasiform distillation and conversion products into the heating zone. Thus, a continuous stream of residual solid particles is passed at a high temperature from the heating zone to the upper portion of the conversion zone to become admixed with the incoming fresh hydrocarbonaceous material and form a mixed fluidized bed of particles suitable for effecting the evolution of desired hydrocarbon fractions from the solid charge stream. Although only a single feed line 2 is shown in the drawing, it is preferable to charge the comminuted hydrocarbonaceous material through a plurality of such feed lines to several points more or less uniformly spaced in a horizontal plane in the upper portion of the fluidized bed in the conversion zone 4.

The fluidization of the bed within the conversion zone is maintained by a hot gaseous or vaporous stream being distributed by suitable headers or distributing pipes 11, which in turn are supplied by means of a line 12 having control valve 13. This fluidizing stream may be high temperature steam, or a reheated gas or light distillate stream from the fractionating zone, or alternately, a suitable heated inert gaseous stream that will provide the desired fluidization without causing the resulting gasiform product stream to become contaminated in such a way as to complicate the separation of the desired hydrocarbon products. In starting up the unit, any inert gas from an external source or a gas or distillate fraction stored during a previous operation may be utilized as the fluidizing medium in the conversion zone. During operation of the preferred embodiment of the unit, high temperature superheated steam that is produced in the quenching of the residual ash-like material is utilized as both a fluidizing and heating medium within the conversion zone. The additional, or alternative, stream of gasiform fluidizing and heating medium may be introduced by way of line 14 and valve 15.

The mixture of carbonized residue and recycled residual material is passed from the conversion zone at its lower end towards the lower center of the chamber 5 and is caused to flow upwardly in a continuous fluidized bed within the heating zone 7, concurrently with an oxidizing and fluidizing stream charged to the lower portion thereof.

The air or oxygen-containing stream passed to the burning and heating zone 7 is introduced by way of a suitable header or distributing line 16, a feed line 17, valve 18, and blower 19. The oxygen content of the fluidizing stream is controlled to provide the desired burning and combustion of at least a portion and preferably substantially all of the residual carbonaceous matter on the resulting particles of spent shale or the like and to attain the desired particle temperature at the upper end of the fluidized bed in the heating zone. The total volume of the fluidizing stream introduced to the lower portion of the heating zone 7 is such as to maintain a desired fluidization and density within this zone so that the solid particles flow continuously from the annular conversion zone 4 into the lower portion of the central heating zone 7, and the elevation of the upper level of the dense phase within the heating zone is such that particles may be continuously withdrawn over the top of the internal wall 9 and into the transfer well to in turn transfer a continuous stream of heated particles to the upper portion of the bed in the conversion zone 4. In a preferable apparatus arrangement, the cross-sectional area of the conversion zone 4 is substantially larger than the cross sectional area of the internal heating zone 7, such that the fluidized bed of particles descending through the conversion zone is allowed sufficient time for maximum evolution of gasiform products while it is at the same time maintained in a denser fluidized mass than that within the heating zone, whereby to facilitate the desired solids downflow in the annular zone and solids upflow within the central zone.

Within the solids transfer well arrangement at the elevated portion of the partitioning member 6, steam or other suitable gasiform sealing and aerating medium is introduced by means of a continuous ring-like header 20 so that the particles entering the well are maintained in a continuous flow therethrough, spilling over from the discharge or up flow leg of the transfer well into the conversion zone 4 and into contact with the solid hydrocarbonaceous material being charged thereto. A suitable feed line 21 having control valve 22 connects with the distributing header 20 in order to supply an adequate amount of aerating and sealing gas. Another distributing header 23 is illustrated in this embodiment within the inlet or downflow leg of the transfer well and is of advantage for distributing a small amount of sealing and stripping medium into the descending stream of particles, whereby to preclude undue compacting of solid particles in the downflow leg and to provide stripping of combustion or flue gases that may be entrained with the stream of particles. The distributing header 23 may be supplied with a suitable inert medium such as superheated steam by means of line 24 and control valve 25. The cross-sectional area of both the downflow leg and the upflow leg of the transfer well is adequate to obviate high velocity flow of the solid particles therethrough and to reduce the resistance to flow as well as preclude any material erosive action of the solid particles on the well, and this is a distinct advantage over tubular transfer conduits.

The resulting gasiform distillation and conversion products, together with used non-oxidizing fluidizing medium are withdrawn from the upper portion of the conversion zone through a suitable particle separating apparatus, such as a centrifugal separator 26, so that the gaseous and vaporous product stream may be discharged in a substantially particle-free state to a fractionating zone (not shown). The gasiform product stream passes by way of line 27 and control valve 28 while recovered solid particles are returned to the fluidized bed in the conversion zone by means of a suitable dip-leg 29. Similarly, resulting combustion or flue gases from the inner combustion and heating zone 7 are discharged from the upper portion thereof through a particle separating apparatus 30, outlet line 31, and control valve 32. Recovered particles entrained with the gas stream and collected by means of the separator 30 are returned by means of a dip-leg 33 to the fluidized bed in the heating zone or preferably to the stream of excess residual particles being separately discharged from the heating zone.

Normally, a regulated portion of the burned and heated residual particles from the heating zone is continuously returned to the conversion zone, and the remaining or excess portion of the residual solid material is separately withdrawn from the heating zone so as to maintain the proper balance of material within the unit. In the present embodiment, the excess hot solid material is discharged from the upper portion of the burning and heating zone as a dense phase stream by way of an internal conduit 34 which extends vertically downward from within the upper portion of the contacting bed in heating zone 7 to an externally positioned quenching zone within a chamber 35 located below and in vertical alignment with the transfer conduit 34.

The chamber 35 provides a heat recovery zone, in which a continuous downwardly moving mass of residual solid particles is maintained, being supplied in heated state by means of the withdrawal conduit 34 and control valve 36. Low temperature steam or preferably water is supplied to the lower portion of the zone 35 by means of line 37 and control valve 38, and resulting steam passes upwardly through the dense phase mass of solid material and thereafter is discharged as high temperature superheated steam through a particle separator 39 and outlet line 40. As in the heating and conversion zones, a centrifugal type of particle separator 39 may be employed to remove entrained particles from the gasiform stream leaving the quenching and heat recovery chamber 35 to return them by means of a dip-leg 41 to the descending bed of solid material in this chamber. The present embodiment also illustrates a flue gas heat exchanger 42, which receives all or a portion of the combustion gases being discharged from zone 7 by way of lines 31 and 43, so that the available heat in the flue gas stream may be utilized to further superheat the steam being discharged from the chamber 35 by way of line 40. Cooled flue gas is discharged from the exchanger 42 by means of a line 44 and control valve 45, while the resulting highly superheated steam is passed to line 14, as well as to line 21 and 24 to furnish desired processing and aerating streams as hereinbefore described. The superheated steam passes by way of line 46 and control valve 47 to the line 14, while excess steam may be discharged by way of line 48 and valve 49 to other process equipment, pumps or heat exchangers as may be desired.

The use of a steam generating and quenching zone for the hot residual particles being withdrawn from the heating zone permits the cooling of the excess residual particles so that they may be handled at a lower temperature and in a convenient manner. Preferably, and as indicated by the drawing, the particles are discharged from the lower portion of the steam generating chamber 35 in a slurry stream by means of a discharge line 50 and control valve 51. Streams of high temperature steam may be supplied to and distributed within the bottom portion of the chamber 5 to provide stripping of the particles which are being transferred from the conversion zone 4 to the lower portion of the heating zone 7. The stripping steam is distributed by means of a header 52, which is connected by the feed line 53 and control valve 54 with the line 53 which in turn is supplied with steam from line 12. Steam is also supplied to the vertical transfer conduit 34 by means of a line 55 and valve 56 in order to supply aerating and stripping steam into the hot residual particles descending in a substantially compact column to the quenching zone.

While the accompanying drawing illustrates one desirable and efficient embodiment of the arrangements of zones providing the improved flow of the invention, it is not intended to limit the improved operation and flow between adjacent zones to the exact apparatus construction or shapes of zones which has been illustrated. Nor is it intended to limit the arrangement of zones to the annular-shaped conversion zone concentric around an internal heating zone. It is, however, a feature of the invention to maintain within the conversion zone a descending fluidized bed which is countercurrent to and in indirect heat exchange relationship with an ascending fluidized bed within the heating zone, such that heat may be continuously conducted from the latter zone to the conversion zone through a desirable large surface and large area partitioning means. With the oxygen-containing stream being introduced at the lower portion of the heating zone, burning and oxidation takes place immediately and a high temperature zone results throughout practically the entire height of the fluidized bed in the heating zone, with high temperature combustion gases carrying on upwardly through this zone as the fluidizing medium. It is also a desirable feature to maintain the withdrawal conduit 34 concentrically within the heating zone so that the particles which are being withdrawn from the unit are maintained in a high temperature condition to subsequently supply a maximum amount of heat to the quenching zone, which in turn permits effective recovery of heat and utilization thereof within the process in an advantageous manner.

In a desirable construction, the portion of the partitioning member 6 which extends upwardly of the solids transfer passageway and normally separates the light phase regions of the heating and conversion zones, may have a suitable refractory type of insulation placed around the interior thereof, such that little or no heat is conducted from the light phase in the heating zone to the light phase within the conversion zone. Normally, additional heating is undesirable at this light phase portion of the conversion zone inasmuch as the vaporous product stream is otherwise liable to become excessively heated or to be subjected to undesirable thermal reaction before being carried to the fractionating zone. The portion of the partitioning member 6 extending downwardly from the solids transfer passageway is preferably vertically corrugated or provided on either or both sides with vertical fins so as to increase the heat-conducting surfaces of the partition between the ascending fluidized bed in the heating zone and the descending fluidized bed in the conversion zone and thereby improve the heat exchange between the fluidized beds.

The apparatus described above with reference to the drawing is applicable to and utilized in the conversion of heavy hydrocarbon oil charging stocks in a manner analogous to that set forth in connection with the destructive distillation of solid carbonaceous materials containing substantial amounts of ash-forming components. However, to accommodate the hydrocarbon oil charge the feed line 2 is replaced by a circular distributing header or other suitable dispersing device 57 having a feed inlet line 58 with valve 59, and this device 57 is disposed at an elevated point of the conversion zone, somewhat below the level of the discharge opening of the solids transfer passageway so that the hydrocarbon oil charge is dispersed within the upper portion of the descending fluidized bed of heated particulated treating residue. The hydrocarbon oil charge before being introduced through line 58 and the distributing device 57 into the descending fluidized bed is preferably preheated by indirect heat exchange with hot combustion gases discharged from the heating zone through line 31 and valve 32 or with partially cooled combustion gases issuing from line 44 through valve 45. Distributing devices similar to the dispersing device 57 may be provided in the lower portions of the descending fluidized bed when it is desired to subject intermediate hydrocarbon oil fractions separated from the gasiform effluent of the conversion zone to further conversion in the latter.

The temperature and pressure conditions applied in the apparatus described with reference to the drawing are substantially as indicated further above. The aerating and sealing medium to be used in the solids transfer well ordinarily is supplied thereto at a rate insufficient to materially affect the temperature of the particulated treating residue during its passage from the heating zone to the conversion zone. Nevertheless, it is preferred that this aerating and sealing medium be supplied to the solids transfer passageway at approximately the same temperature as the temperature of the particles entering this passage-way. It will also be understood that the aerating and sealing medium thus used should be devoid of free oxygen in order to preclude contamination of the gasiform conversion products. During normal operation of the process, the proportion of aerating and sealing medium passing upwardly through the downflow leg of the solids transfer well, namely between the partitioning member 6 and the inner well wall 9, is always regulated, relative to the proportion of the aerating medium passing upwardly through the upflow leg between the member 6 and the outer well wall 10, so that the particle mass in the downflow leg is maintained at a substantially greater density than that in the upflow leg, and preferably greater also than the density of the descending fluidized bed in the conversion zone 4, while the latter density is always maintained substantially greater than the density of the ascending fluidized bed in the heating zone 7.

The pressures in the light phase regions of the contiguous processing zones are controlled and preferably equalized by suitable pressure control devices actuating through the valves 32 and 28, respectively, upon the rate of discharge of the combustion gases from the heating zone 7 through line 31 and upon the rate of discharge of the gasiform effluent from the conversion zone 4 through line 27. The vertical depth of the trough or transfer well may vary; it may be relatively small, namely about twice as large as the width of the well, when practically only equal pressures are to be maintained in the contiguous processing zones, but should be substantially greater when the processing zones are to operate at a pressure differential, and in all cases should be so large that the depth of the dense particle mass inside the well is more than sufficient to preclude the flushing of this mass out of the well upon operational variations of the pressure in the light phase region of either of the contiguous processing zones.

I claim as my invention:

1. A unitary apparatus suitable for converting hydrocarbonaceous reactants in a fluidized bed of particulated solid material and comprising, in combination, a vertically disposed chamber having a partitioning member extending from the upper end thereof to within a short distance from the lower end of said chamber, said partitioning member subdividing said chamber into an inner particle contacting section and an outer annular particle contacting section, a reactant inlet to an elevated portion of said outer annular section, separate gas outlet means from the upper portions of the contiguous contacting sections, fluid inlet and distributing means at the lower end of each of said contacting sections, perforations in said partitioning member within the upper portion thereof and spaced a substantial and uniform distance from the upper end of said chamber, baffles extending from said partitioning member on each side thereof and upwardly from below said perforations substantially concentrically with and spaced from said partitioning member to an elevation above said perforations but substantially below said upper end of the chamber, said baffles and perforations forming a U-shaped transfer well for passing sub-divided particles from one contacting section to the other, fluid distributing means within said transfer well and at the lower end of said chamber positioned to promote directional flow and circulation of solid particles between said contiguous contacting sections, and a particle withdrawal conduit extending from a point within the upper portion of said inner contacting section and below the upper limit of the baffle within said partitioning member downwardly through the lower portion of said chamber, said particle withdrawal conduit being provided for discharging solid particles from said inner contacting section.

2. The apparatus of claim 1 further characterized in that the baffle within said partitioning member extends to a higher elevation than the baffle on the outside of said partitioning member, whereby to permit maintaining a fluidized particle bed within the inner contacting section at a higher fluid level than in said outer annular contacting section and providing thereby a flow of particles from the top of the bed in the inner contacting section through said transfer well to the top of the bed in said outer annular contacting section.

3. A unitary apparatus suitable for converting hydrocarbonaceous reactants in a fluidized bed of particulated solid material and comprising, in combination, a vertically disposed conversion chamber having a substantially cylindrical partitioning member depending from the upper end thereof and extending to within a short distance from the lower end of said chamber, said partitioning member subdividing said chamber into an inner particle contacting section and an outer annular particle contacting section, a reactant inlet to an elevated portion of said outer annular section, separate gas outlets from the upper portions of the contiguous contacting sections, fluid inlet and distributing means at the lower end of each of said contacting sections, perforations in said partitioning member within the upper portion thereof and spaced a substantial and uniform distance from the upper end of said chamber, baffles extending from said partitioning member on each side thereof and upwardly from below said perforations substantially concentrically with and spaced from said partitioning member to an elevation above said perforations, said baffles and perforations forming a U-shaped transfer well for the passage of sub-divided solid particles from the inner contacting section to the annular contacting section, fluid distributing means within said transfer well and at the lower end of said chamber positioned to promote directional flow and circulation of solid particles between said contiguous contacting sections, an open-ended particle withdrawal conduit positioned substantially centrally within said inner contacting section and extending from a point below the upper limit of the baffle within said partitioning member vertically downwardly to the interior of a confined quenching chamber, said quenching chamber being positioned below said conversion chamber and in vertical alignment therewith, a fluid inlet to the lower portion of said quenching chamber and a gas outlet from the upper portion thereof, and particle outlet means from the bottom portion of said quenching chamber.

4. The apparatus of claim 3 further characterized in that the baffle within said partitioning member extends to a higher elevation than the baffle on the outside of said partitioning member, and said reactant inlet terminates in a distributing device which is disposed in the upper portion of the annular contacting section at an elevation below the upper limit of said baffle on the outside of the partitioning member and is adapted to disperse a fluid hydrocarbonaceous reactant stream into a fluidized bed of solid particles below the fluid level of said bed within said annular contacting section.

5. The apparatus of claim 3 further characterized in that the baffle within said partitioning member extends to a higher elevation than the baffle on the outside of said partitioning member, and said reactant inlet terminates within the proximity of a horizontal plane through the upper limit of said baffle on the outside of said partitioning member and is adapted to distribute comminuted solid hydrocarbonaceous reactant to the upper portion of a fluidized bed of solid particles in the annular contacting section.

(References on following page)

References Cited in the file of this patent

UNITED STATES PATENTS

| | | |
|---|---|---|
| 2,339,932 | Kuhl | Jan. 25, 1944 |
| 2,378,342 | Voorhees | June 12, 1945 |
| 2,433,726 | Angell | Dec. 30, 1947 |
| 2,445,327 | Keith | July 20, 1948 |
| 2,445,328 | Keith | July 20, 1948 |
| 2,457,232 | Hengstebeck | Dec. 28, 1948 |
| 2,464,812 | Johnson | Mar. 22, 1949 |
| 2,480,670 | Peck | Aug. 30, 1949 |
| 2,485,315 | Rex et al. | Oct. 18, 1949 |
| 2,506,317 | Rex | May 2, 1950 |
| 2,534,728 | Nelson et al. | Dec. 19, 1950 |
| 2,544,843 | Leffer | Mar. 13, 1951 |
| 2,582,710 | Martin | Jan. 15, 1952 |
| 2,582,711 | Nelson | Jan. 15, 1952 |
| 2,654,699 | Lesher | Oct. 6, 1953 |